(12) United States Patent
Ariizumi

(10) Patent No.: US 8,807,234 B2
(45) Date of Patent: Aug. 19, 2014

(54) AUTOMATED STORAGE SYSTEM

(75) Inventor: Masashi Ariizumi, Shiga (JP)

(73) Assignee: Daifuku Co., Ltd. (JP)

( * ) Notice: Subject to any disclaimer, the term of this patent is extended or adjusted under 35 U.S.C. 154(b) by 269 days.

(21) Appl. No.: 13/305,039

(22) Filed: Nov. 28, 2011

(65) Prior Publication Data

US 2012/0265333 A1    Oct. 18, 2012

(30) Foreign Application Priority Data

Nov. 26, 2010   (JP) .................................. 2010-263798

(51) Int. Cl.
*A62C 25/00* (2006.01)

(52) U.S. Cl.
USPC .................. 169/52; 169/11; 169/16; 169/37; 169/54; 169/61; 169/70; 239/750; 414/273

(58) Field of Classification Search
USPC ........ 169/16, 37, 52, 54, 70, 11, 61; 239/722, 239/750; 414/266, 267, 273
See application file for complete search history.

(56) References Cited

U.S. PATENT DOCUMENTS

| | | | | |
|---|---|---|---|---|
| 3,602,313 | A | | 8/1971 | Achs |
| 4,178,994 | A | * | 12/1979 | Ito et al. ............................ 169/16 |
| 4,319,662 | A | * | 3/1982 | Liston .............................. 169/52 |

FOREIGN PATENT DOCUMENTS

| | | |
|---|---|---|
| JP | 05246506 | 9/1993 |
| JP | 09-221201 | 8/1997 |
| JP | 09226909 | 9/1997 |
| JP | 2008-063032 | 3/2008 |
| JP | 2010186568 | 8/2010 |

OTHER PUBLICATIONS

Extended European Search Report of European Application No. 11190541.0, dated May 31, 2013.

* cited by examiner

*Primary Examiner* — Steven J Ganey
(74) *Attorney, Agent, or Firm* — Mayback & Hoffman, P.A.; Gregory L. Mayback; Rebecca A. Tie

(57) ABSTRACT

An automated storage system is presented, in which a stacker crane can properly operate even in a high temperature environment, while simplifying the construction of the system facility.

The automated storage system includes articles storage racks having a plurality of storage spaces for storing articles; a stacker crane 3 which freely travels along the travelling path, and a ground controller H which is on the ground side to control the operation of the stacker crane, and a fire fighting nozzles 26 on the platform 20. The article storage racks and the stacker crane are located in a high temperature environmental space Z2, while the extinguishant supply source 27 and the ground side controller are in a normal temperature environmental space Z1. A control line 31 is established from the ground side controller and the stacker crane, and a fire fighting hose 30 is from the extinguishant supply source to the fire fighting nozzle. The control line and the fire fighting hose are contained in a common travelling cable guide 32 and have travelling portions to be guided 30a and 31a, whose paths are deformable in accordance with the course of the travelling carriage 18.

6 Claims, 7 Drawing Sheets

AUTOMATED STORAGE SYSTEM

BACKGROUND OF THE INVENTION

1. Field of the Invention

The present invention relates to an automated storage system, particularly, automated storage system includes article storage racks having a plurality of storage spaces for storing articles; a stacker crane having a travelling carriage which can travel along a travelling path established on the front side of the article storage racks, a platform which can freely move up and down along masts stood from the travelling carriage, and a transfer device equipped on the platform for freely transferring the articles between the platform and the storage spaces; and a controller provided on a ground side for controlling the operation of the stacker crane; wherein fire fighting nozzles, to which fire extinguishant is supplied from a fire extinguishant supply source from which the extinguishant is spread to the storage spaces, are provided on the platform of the stacker crane.

2. Related Art

A conventional automated storage system is disclosed in Japanese Patent Preliminarily Publication No. Hei9-221201. In the facility disclosed in this publication, article storage racks and a stacker crane are provided in a normal temperature environmental space, and a fire hydrant as a fire extinguishant supply source is also in the same normal temperature environmental space. Further, the controller on the ground side for controlling the operation of the stacker crane, as well as a control device for controlling the water, as a fire extinguishant, supply from the fire hydrant between a supply condition and a non-supply condition, are also provided in a normal temperature environmental space.

According to the facility disclosed in Japanese Patent Preliminarily Publication No. Hei9-221201, the fire fighting hose is wound around a hose reel on the stacker crane, one end of which is connected to the fire fighting nozzle on the platform and the other end of which is normally open without being connected. Once a fire breaks out, the stacker crane travels to a starting point on the travelling path to connect the fighting hose to the fire extinguishant supply source (fire hydrant) provided at the starting point, then the fighting hose is automatically connected to the fire extinguishant supply source. Since the fighting hose wound on the hose reel is let out or in, in accordance with the travelling operation of the stacker crane, the stacker crane can travel in an appropriate manner even if the fighting hose is connected between the ground side and the stacker crane (see paras. [0016], [0017], [0027] and [0028], and FIGS. 1 and 2 of the Publication).

In FIG. 1 of the Publication, it is mentioned that the controller on the ground side and the stacker crane communicate wirelessly. The controller on the ground side and the stacker crane communicate control signals required for controlling the operation of the stacker crane. When the stacker crane and the controller on the ground side transmit controlling signals wirelessly, a transmitting-receiving apparatus should be provided on each of the ground controller side and the stacker crane to wirelessly communicate to each other, as shown in FIG. 3. of the Japanese Patent Preliminarily Publication No. 2008-63032, to transmit the control signals required for controlling the operation of the stacker crane. The stacker crane should have a wireless communication processing apparatus for taking up control information from the signals received, and for converting the control signals to wireless communication signals and then sending them. It should be noted that an embodiment in the Japanese Patent Preliminarily Publication No. 2008-63032 disclosed that light projector-receiver is provided on each of the stacker crane and the ground controller side, respectively, to transfer control signals by means of infrared data communication (see FIG. 3 of the Japanese Patent Preliminarily Publication No. 2008-63032).

Depending on the use of the automated storage system facility, in some cases, articles should be stored in a high temperature environmental space, whose temperature is set higher than that of the normal temperature environmental space. In such case, carbon dioxide is used as an fire extinguishant and carbon dioxide cylinder is used as an extinguishuant supply, the carbon dioxide cylinder as a fire extinguishant supply source could be exploded, because it is exposed to such a high temperature environment. Even in a case that water is used as a fire extinguishuant, the water temperature becomes so high that the extinguish effect would be reduced. In a case of using some chemical agent as a fire extinguishant, the agent would be deteriorated so that the extinguish effect would also be decreased.

Furthermore, if the switching device (for instance, electromagnetic valve, etc.) for switching the extinguishant supply source condition from the extinguishant supply source to the fire fighting hose between the supply condition and the non-supply condition is subjected to the high temperature environmental space, the operation of the switching device cannot be guaranteed due to the high temperature. Therefore, in case of a fire, it still remains possibilities that the condition could not be switched to the extinguishuant supply condition, so that an extinction could not be achieved.

When storing articles in a higher temperature environmental space, where the temperature is set to be higher than that of the normal temperature environmental space, the article storage racks or the stacker crane of the automated storage system facility would also be laid in a high temperature environmental space. Therefore, in the conventional automated storage system facility, where the control signals are transmitted between the ground controller side and the stacker crane by wireless transmission, the wireless signal processor on the stacker crane would be subjected to the higher temperature environment. Since such wireless signal processor includes semiconductor devices where sophisticated signal operation is performed, no proper operation would be guaranteed in such a higher temperature environmental space. Thus, proper control signal transmission could not be performed between the ground side controller and the stacker crane, so that the stacker crane could not properly operate in the high temperature environment space.

To address this problem, it is considered to connect the stacker crane and the ground controller side by means of wired control line so that the control signals can be transmitted in a normal manner between the ground controller side and the stacker crane provided in the higher temperature environmental space. However, as in the conventional system where the fire fighting nozzle is provided on the stacker crane while the fire extinguishant supply source is at the ground side and the fire fighting nozzle and the extinguishant supply source are connected by the fire fighting hose, both the signal control line and the fire fighting hose are connected between the ground side and the stacker crane, which makes the structure of the system so complex that the travelling of the stacker crane could not be performed appropriately.

SUMMARY OF THE INVENTION

The purpose of the present invention is to provide an automated storage system, in which the structure of the system facility is made simple whilst the stacker crane can be operated appropriately even in a high temperature environmental space, and in case of fire the articles in the storage spaces can be suitably extinguished.

In order to achieve the purpose, the first characterized structure of the automated storage system according to the invention is: the automated storage system includes article storage racks having a plurality of storage spaces for storing articles; a stacker crane having a travelling carriage which can travel freely along a travelling path established on the front side of the article storage racks, a platform which can freely move up and down along lifting masts stood from the travelling carriage, and a transfer device equipped on the platform for freely transferring the articles between the platform and the storage spaces; and a ground controller provided on a ground side for controlling the operation of the stacker crane; wherein fire fighting nozzles, which are supplied with fire extinguishant from a fire extinguishant supply source are provided on the platform of the stacker crane for spreading the fire extinguishant to the storage spaces, wherein the storage spaces for articles and the stacker crane are provided in a high temperature environmental space where the temperature is kept higher than that of a normal temperature environmental space, the fire extinguishant supply source and the ground side controller are provided in a normal temperature environmental space; a signal control line for transmitting control signals is provided being connected between the ground controller side and the stacker crane; a fire fighting hose is provided being connected between the fire extinguishant supply source and the fire fighting nozzle for supplying a fire extinguishant from the fire extinguishant supply source to the fire fighting nozzle; and wherein the signal control line and the fire fighting hose are contained in a common travelling cable guide, which is provided along the travelling path in the high temperature environmental space, and have a travelling part to be guided, whose path is deformable in accordance with the course of the travelling carriage.

According to the first characterized structure, although the stacker crane is provided in the high temperature environmental space, the ground side controller and the stacker crane are connected by the control line; thus it is possible to transmit control signals without using wireless signals between the ground side controller and the stacker crane. Therefore, it is not necessary to provide a signal processor, which takes control information out from the wireless signals received and converts it to wireless signals and transmit the signals, on the stacker crane. This is not like the system which uses a wireless transmitting system. Thus, even if the stacker crane is provided in a high temperature environmental space, the stacker crane can surely transmit and receive the control signals with a high degree of reliability. Further, since the ground side controller is provided in a normal temperature environmental space, it correctly operates to surely transmit and receive the control signals. In such a manner, the control signals are transmitted between the ground side controller and the stacker crane with a high degree of reliability, so that the stacker crane can operate normally even in a high temperature environmental space.

Furthermore, since the fire fighting hose is connected between the fire extinguishant supply source, which is provided at the ground side, and the fire fighting nozzle on the platform of the stacker crane, the extinguishant is communicated from the fire extinguishant supply source to the fire fighting nozzle, so that the extinguishant can be spread from the fire fighting nozzle to the article storage racks. Since the fire extinguishant supply source is provided in the normal temperature environmental space, it can prevent the increase of the temperature and the deterioration of the extinguishant. Particularly, the fire extinguishant supply source is a carbon dioxide cylinder, an explosion of the fire extinguishant supply source can be prevented. Furthermore, the switching device, such as an electro-magnetic valve, for switching the condition of supply of the extinguishant from the fire extinguishant supply source to the fire fighting hose between a supply condition and a non-supply condition can be provided in the normal temperature environmental space; thus, the normal operation of the switching device is guaranteed, and therefore, in case of fire, it is possible to switch into the supply condition of the switching device as appropriate.

Moreover, both the control line and the fire fighting hose are contained in the common travelling cable guide, which is established along the travelling path of the stacker crane and has a travelling portion to be guided whose path is deformable in accordance with the course of the travelling carriage. Therefore, the travelling portion to be guided of the control line and the fire fighting hose are deformed in accordance with the course of the travelling carriage in a condition in which it is guided by the travelling cable guide along the travelling path of the stacker crane. Thus, the stacker crane can travel appropriately along the travelling path even under the condition in which that the control line is between the stacker crane and the ground side controller and the fire fighting hose is between the stacker crane and the fire extinguishant supply source.

In addition, since the control line and the fire fighting hose are contained in the common travelling cable guide, it is not necessary to have separate cable guides for the control line and the fire fighting hose, this enabling the structuring of the system facility to be made simple.

As mentioned above, according to the first characteristic structure of the present invention, the structure of the automated storage system can be made simple, whilst the stack crane can be made to suitably operate even in a high temperature environmental space and a fire on articles in the storage spaces can be appropriately extinguished appropriately.

The second characterized structure of the automated storage system according to the present invention is: the travelling carriage is designed such that the width thereof is formed narrower than that of the platform and the travelling cable guide is located to be superimposed with the platform in a width direction of the travelling carriage viewed from the floor surface.

According to the second characterized structure, since the travelling cable guide can be provided on the floor surface, the fitting work thereof could be easier in comparison with the cases of fitting the guide on ceiling or on wall. Further, the travelling portion to be guided of the travelling control line and the fire fighting hose are provided being guided by the cable guide at a height close to the floor surface, so that the height becomes suitable when connecting the control line and the fire fighting hose to the travelling carriage of the stacker crane. Furthermore, since the width of the travelling carriage is narrower than that of the platform in the width direction of the travelling carriage, spaces are formed at both side of the travelling carriage when the platform comes down to its lower limit position. By locating the travelling cable guide at a position superposed with the platform in a width direction of the travelling carriage on the floor surface, the spaces formed both sides of the travelling carriage can be used in an effective manner.

The third characterized structure of the automated warehouse system facilities according to the present invention is: the portion of the fire fighting hose located in the high temperature environmental space has a mast setting portion, which is provided along the lifting mast, in the downstream further along than the travelling portion to be guided in the direction of the fire extinguishant supply source; the stacker crane comprises an article transfer device control line for transmitting control signals for controlling an article transfer device among the signals to be sent to the control line; the control line for controlling the article transfer device is provided along the lifting mast; and the transfer device control line and the mast setting portion of the fire fighting hose are contained in a common lifting cable guide and have a lifting portion to be guided, whose path is deformable in accordance with the elevation of the platform.

According to the third characterized structure, the lifting portion to be guided, from amongst the mast setting portion provided along the lifting mast, is contained in the lifting cable guide; and, since the path of the lifting portion to be guided is deformable in accordance with the elevation of the platform, the platform can be suitably lifted while keeping the condition in which the fire fighting hose is connected to the fire fighting nozzle formed on the platform.

Further, since a transfer device control line is provided, which transmits control signals for the transfer device provided on the platform, the control signals necessary for controlling the operation of the transfer device can be transmitted between the ground side controller and the platform via the control line from the ground side controller and the transfer device.

Furthermore, the transfer device control line is arranged along the lifting mast; and the lifting portion to be guided thereof is contained in the lifting cable guide. Since the path of the lifting portion to be guided is deformable in accordance with the elevation of the platform, the platform can be suitably lifted along the lifting mast, even in a condition in which the transfer device control line is being connected to the platform.

In addition, since the lifting cable guide in which the transfer device control line and the mast setting portion of the fire fighting hose are commonly used, it is not necessary to provide cable guides separately for the transfer device control line and for the mast setting portion of the fire fighting hose, and therefore the construction of the system can be made simpler.

According to the fourth characteristic structure of the automated storage system facility of the present invention is: both ends of the portion of the fire fighting hose including the travelling portion to be guided are connected to the ground side hose portion, which is arranged in a fixed condition with the ground, and to the crane side hose portion, which is arranged in a fixed condition with the travelling carriage and the lifting mast, respectively, in a detachable manner.

According to this characteristic structure, since the both ends of the portion of the fire fighting hose including the travelling portion to be guided are connected to the ground side hose portion and the crane side hose portion, respectively, in a detachable manner, the portion of the fire fighting hose including the travelling portion to be guided can be detached from the ground side hose portion and the crane side hose portion by releasing the connections therebetween. The travelling portion to be guided of the fire fighting hose is contained in the travelling cable guide, and the path for this travelling portion to be guided is deformable in shape in accordance with the course of the stacker crane, such that when the travelling operation for the stacker crane is repeated, the deformation in shape of the travelling portion to be guided of the fire fighting hose is also repeated. Therefore, compared to other portions of the fire fighting hose, the travelling portion to be guided is susceptible to deterioration due to aging.

According to the fourth characterized structure of the present invention, portions of the fire fighting hose in which the degree of deterioration does not necessitate exchange can be left as is, but only the travelling portion to be guided of the fire fighting hose, which is susceptible to deteriorate, can be taken off to be partially exchanged with a new part of fire fighting hose. Therefore, it is not necessary to replace the hose as a whole, and therefore the cost for such an exchange can be reduced. Further, during an operation for containing a fire fighting hose into the travelling cable guide, it is only necessary to replace the part which includes the travelling portion to be guided. This means an operator only has to deal with a comparatively short part of the fire fighting hose, whose whole length is significantly long, and thus the workability of the hose storage operation into the travelling cable guide is improved.

The fifth characteristic structure of the automated storage system facility of the present invention is: the fire extinguishant is carbon dioxide; the fire extinguishant supply source is constituted by a carbon dioxide cylinder; and an electromagnet type on-off valve is provided for switching between the carbon dioxide supplying condition and carbon dioxide supply stopping condition from the carbon dioxide cylinder to the fire fighting hose in the normal temperature environment space.

According to the fifth characteristic structure, the carbon dioxide gas is spread to the articles in the article storages. Therefore, after the extinguishing operation is performed for the articles, the extinguishant is diffused in the surrounding air. In such a condition, the article storage racks, the floor surface, or the stacker crane will not get soiled with the extinguishant, and thus restoration operations after extinguishing a fire on the article become easier and restoration to a normal condition can be performed quickly.

The sixth characteristic structure of the automated storage system facility according to the present invention is: the stacker crane comprises a running motor and a running inverter for driving the running motor, a lifting motor and a lifting inverter for driving the lifting motor, and a transfer motor and a transfer inverter for driving the transfer motor, and the ground side controller is configured to freely send the control signals for controlling the corresponding motors independently to the running inverter, the lifting inverter, and the transfer inverter.

According to the sixth characteristic structure, the ground side controller can control the operation of the running motor, the lifting motor, and the transfer motor, by sending control signals to each inverter. As the control signal sent to the inverter, a pulse signal in case of PWM controlling of power voltage or frequency could be used, for instance. That is to say, a high calculating capability, required to appropriately control the running and lifting operations to place the transfer device of the stacker crane at a target position as well as the transferring operations for loading and unloading articles, is performed in the ground side controller, while the motors can be driven by the inverters, which are operated based on signals where no calculation is necessary. By such arrangement it is not necessary to place semiconductor products with a comparatively high degree of integration, where the upper limit of the proper operation temperature is comparatively low, such as is the case with high performance micro-computers in which a high level of calculation can be performed, at the stacker crane side in a high temperature environment space. Therefore, the failure of the semiconductor products for performing such calculating processes for controlling the stacker crane due to the thermal runaway can be prevented thus making it possible to properly operate the stacker crane.

DETAILED EXPLANATION OF PREFERRED EMBODIMENTS OF THE INVENTION

Figure 1:
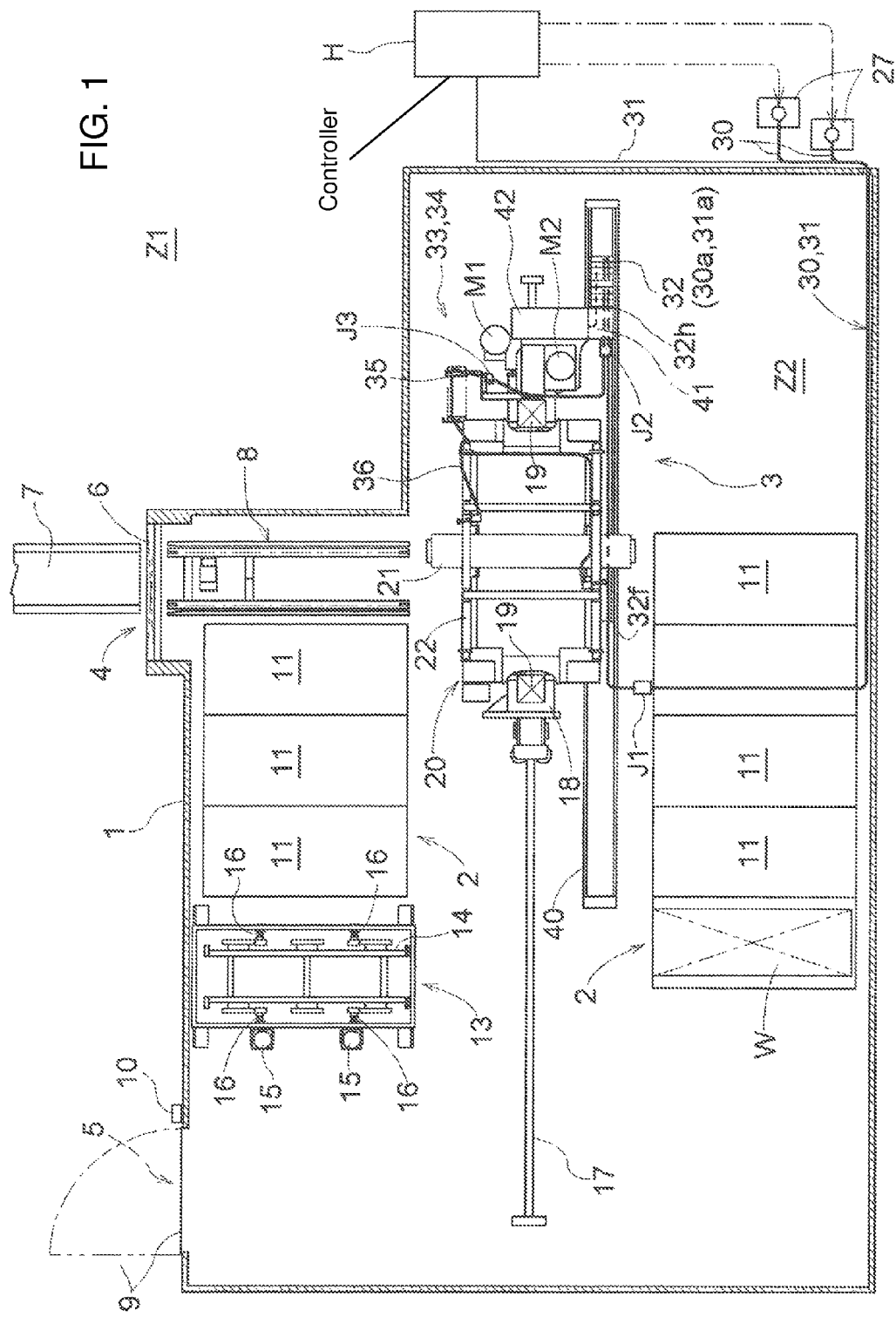
FIG. 1 is a plan view showing an automated storage system facility as a whole.

Preferred Embodiments of automated storage system facilities according to the present invention will be explained, referring to the drawings. In the automated storage system facilities of the embodiment, collected packages of a plurality of Lithium ion batteries are stored as articles W.

[Whole Structure of the Facilities]

Figure 2:
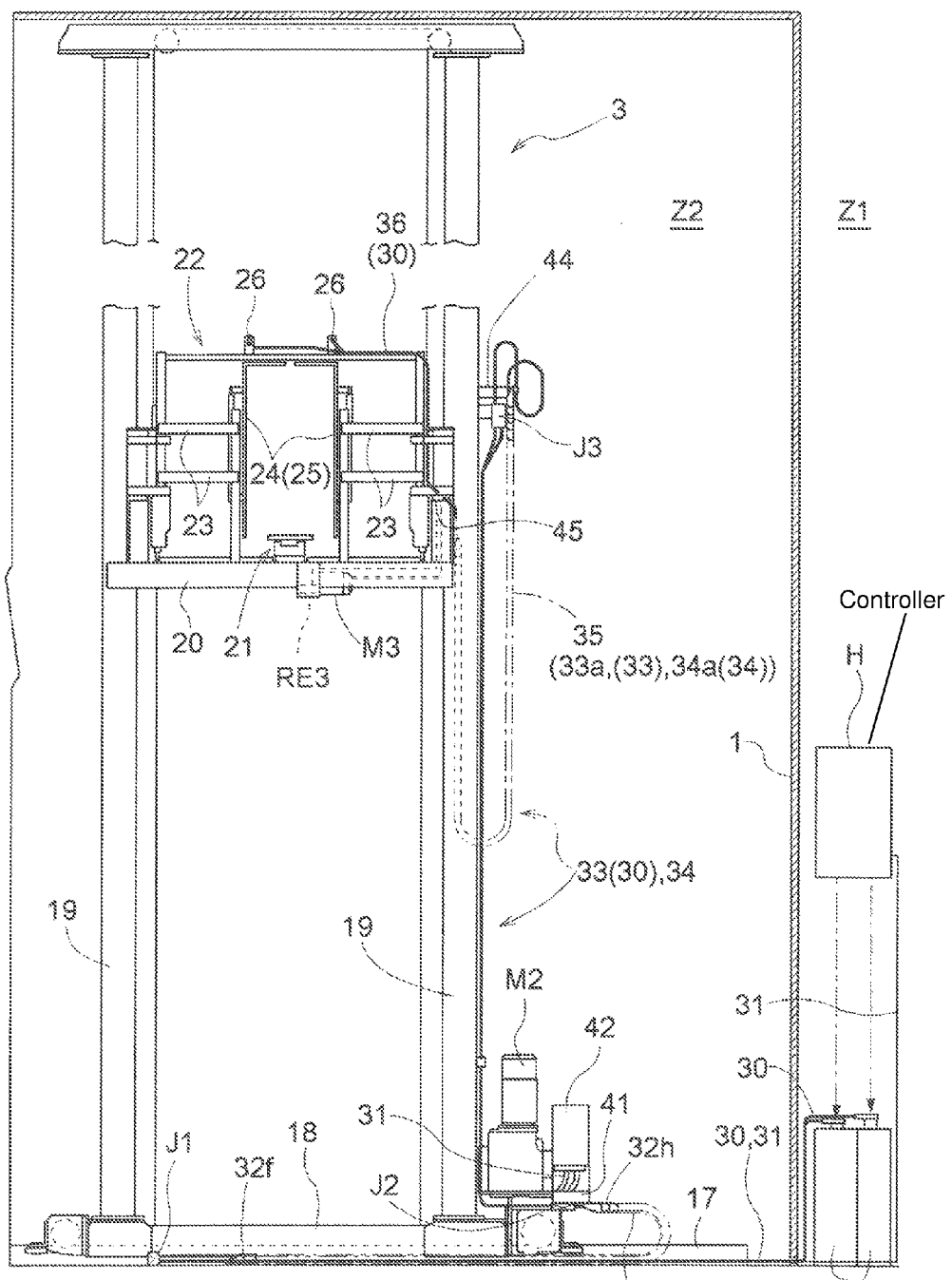
FIG. 2 is a partial side view depicting an automated storage system facility.

As shown in FIGS. 1 and 2, a compartment wall 1 is provided on the floor F in a normal temperature environment Z1 in a building. A high temperature environment space Z2 is separated from the normal temperature environment space Z1 by means of the compartment wall 1; and article storages 2 and a stacker crane 3 are provided in the space Z2. Although not shown in the figures, the compartment wall 1 is also formed on the ceiling side, so that the normal temperature environment space Z1 and the high temperature environment space Z2 are also separated from each other in a vertical direction. That is to say, the high temperature environment space Z2 is closed, which is compartmentalized from the normal temperature environment space Z1 by means of the compartment wall 1. The temperature in the high temperature environment space Z2 is maintained higher, e.g. 60 degrees Celsius, than that in the normal temperature environment space Z1, by an air controller (not shown in figures.)

On one of the side surfaces of the compartment wall 1, a doorway 4 for loading/unloading articles W between the normal temperature environment space Z1 and the high temperature environment space Z2 and a doorway 5 for workers who perform maintenance work for stacker crane 3, etc. On the upper edge of the doorway 4, a sheet shutter 6 is provided to open and close the doorway 4. The sheet shutter 6 is normally closed, and automatically opens when an article W is loaded/unloaded.

At the normal temperature environment space Z1 side of the doorway 4, a loading/unloading conveyer 7 is provided, while on the high temperature environment space Z2 side of the doorway 4, an entering/dispatching conveyer 8 is provided. The loading/unloading conveyer 7 conveys an article W from a given origin to the doorway 4 to deliver the article W to the entering/dispatching conveyer 8 in an open condition of the sheet shutter 6. The entering/dispatching conveyer 8 conveys the article W to a position to deliver it to the stacker crane 3. The entering/dispatching conveyer 8 also conveys the article W from the position to the doorway 4, to load the article W to the loading/unloading conveyer 7 in an open condition of the sheet shutter 6. The loading/unloading conveyer 7 conveys the article W to a given destination.

At the doorway 5 for workers, a door 9, which freely opens, and a door switch 10 for detecting a condition that the door 9 is being closed, are provided.

[Article Storage Racks]

Article storage racks 2 are provided on both sides of a travelling path of the stacker crane 3, having a plurality of storage spaces 11 lengthwise and breadthwise for freely containing articles W. Each storage space 11 has fireproof panels on the upper/lower and left/right sides thereof, and the bordering spaces 11 are compartmentalized from each other. Underneath the fireproof panel provided on the upper side of the spaces 11, a fire sensor 12 for detecting heat and smoke is attached (see FIG. 6). Although not shown in FIG. 1, the fire sensor 12 on each space 11 is connected to a controller H, which will be explained later, provided in the normal temperature environment space Z1 side by a signal line penetrating through the compartment wall 1, to enter the signal detected by the fire sensor 12 to the controller H.

[Water Tank]

At one of the pair of article storage rack 2, a water tank 13 is provided, which is for submarizing articles W in the event of fire to lie down the fire. The water tank 13 is positioned to be bound to the article storage 2 outside in its wide width direction. In the water tank 13, a frame for receiving an article 14 is provided for mounting and supporting the article W. The frame 14 is freely lifted by a pair of electronic motors 15 along a lifting guide 16 between an article receiving height, which is above the water surface and an article submerging height, which is under the water surface. The frame for receiving an article 14 is normally held at the article receiving height, but is arranged to be automatically lifted down to the height under the water, once the article 14 is fired and the fired article W, to which an initial extinction has been performed by the stacker crane 3 in the rack 11, is mounted on the frame 14 by the stacker crane 3.

[Stacker Crane]

The stacker crane 3 has a travelling carriage 18 runnable along a rail 17 provided on the floor surface F of the travelling path on the front surface side of the article rack 2, a platform 20 which is freely lifted along a pair of front and rear lifting masts 19 stood from the travelling carriage 18, and a fork device 21 provided on the platform 20 for freely transferring an article W between the space 11 and the stacker crane 3.

On the one side of the travelling carriage 18 where the controller H is provided (hereinafter referred to HP side), a running motor M1 and a lifting motor M2 are provided at an end portion thereof; and on the platform 20 a transferring motor M3 is provided. The fork device 21 is freely protruded or retried both left and right sides by the forward and reverse inverting rotation of the transferring motor M3. The stacker crane 3 is arranged to be able to carry the article W between the space 11 of the pair of article storage racks 2 and the entering/dispatching conveyer 8 or the frame 14 in the water tank 13 by performing the loading/unloading operation by the protruding or retrieving operation of the fork device 21 with the aid of the transferring motor M3 or the lifting operation of the platform 20 after positioning the fork device 21 to the transferring position for the space 11 to be transferred, or the entering/dispatching conveyer 8 by the running operation of the travelling carriage 18 with the aid of the running motor M1 or the lifting operation of the platform 20 by the lifting motor M2.

Figure 6:
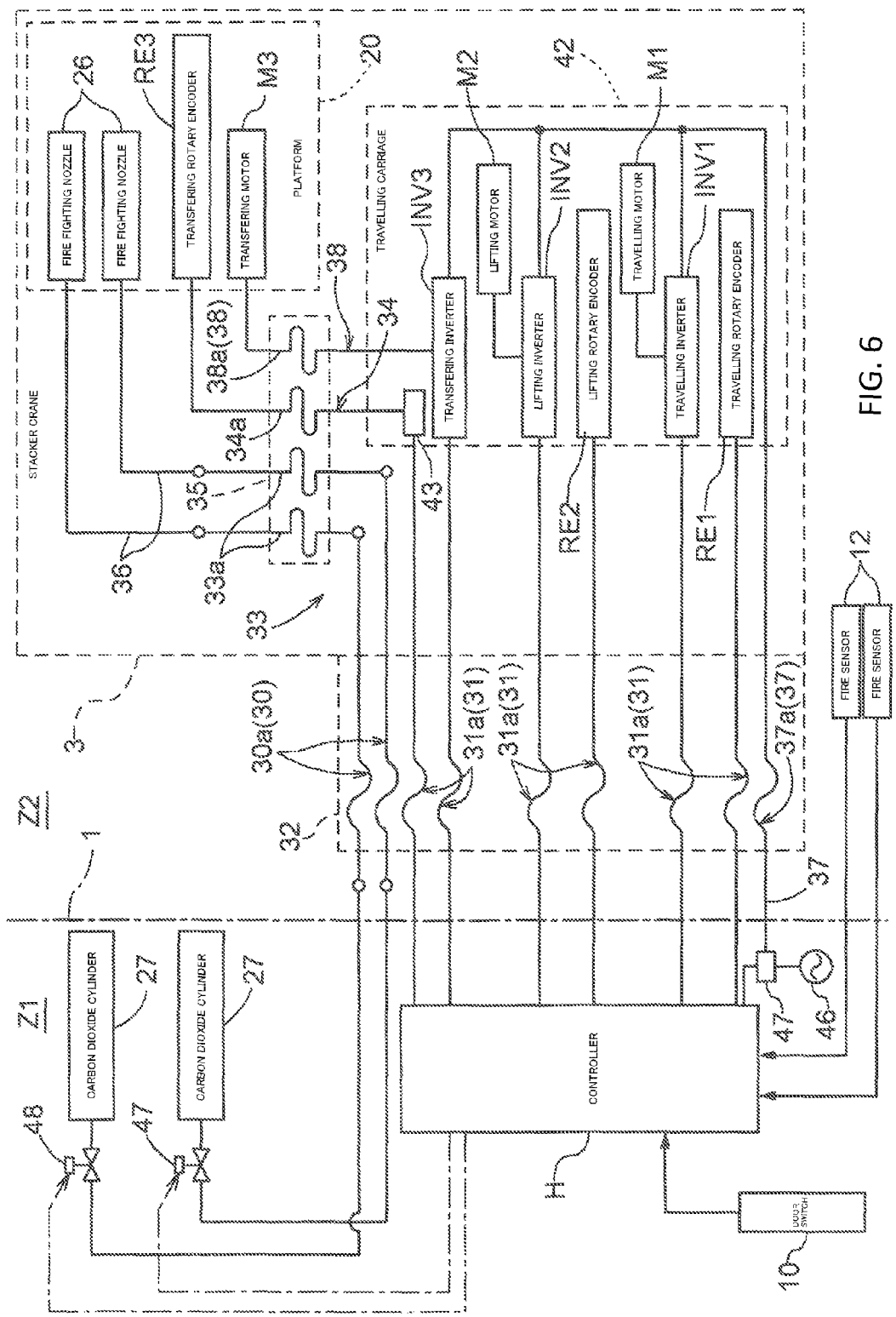
FIG. 6 is a block diagram showing the control of the system.

A travelling rotary encoder RE1 as a travelling position detecting means for the travelling carriage 18 is provided on the travelling carriage 18, and a lifting rotary encoder RE2 as a lifting position detecting means for the platform 20 is provided on the platform 20, and a transferring rotary encoder RE3 as a protruding/retrieving position detecting means for the fork device 21 is provided on the platform 20 (see FIG. 6).

Although not shown in the figures, the travelling rotary encoder RE1 outputs pulses the number of which corresponds to the rotating amount of a pinion gear threaded with a rack gear provided along the rail. The lifting rotary encoder RE 2 outputs pulses the number of which corresponds to the rotating amount of the lifting driving sprocket, which is rotated and driven by the lifting motor M2. The lifting driving sprocket operates to wind a pair of loop hanging chains, both ends of which are connected to the upper end portion and the lower end portion of the platform 20 in its front and rear direction, and which are overlaid across the stacker crane 3 one above the other on the stacker crane 3 in a condition in which the chains run via an idling sprocket provided on an upper frame, and a plurality of guiding sprockets provided on the travelling carriage 18, to the inside of the lifting masts at HP sides. The transferring rotary encoder RE3 outputs pulses, the number of which corresponds to the rotating amount of the protruding/retrieving driving sprockets, which are rotatably driven by the transferring motor M3. The protruding/retrieving sprockets operate to wind a circulated chain, which is overlaid on the idling sprocket, which is coincident with the pinion gear being threaded to the rack gear provided on the fork device 21.

As shown in FIG. 2, a supporting frame 22 framed by pipes and L-shaped members is provided on the platform 20. To the supporting frame 22, an article shape defect detecting device 25 is attached by four supporting brackets 23; the device comprises a pair of front and rear guide sticks 24 which are arranged to be spaced in the front and rear direction of the sacker crane 3 so as to be freely fluctuate about the longitudinal axis. Each of the pair of guide sticks 24 is energized to a standard position with the aid of a coil spring provided at the base end position of the fluctuation; and a pair of limit switches is attached to the supporting brackets 23 for detecting the positional shift of the base end position when the guide sticks 24 are fluctuated. The distance between the pair of guide sticks 24 in the front and rear direction is set to be slightly longer than the width of the article W and a horizontal portion is provided on the top portions of the pair of guide sticks 24. Thereby, when transferring the article W mounted and supported by the fork device 21, the article shape defect of the article W in upper and lower and front and rear direction can be detected by the fact that the corresponding limited switches become ON when the article W contacts to the guide sticks 24. It should be noted that an article shape defect detecting device 25 is provided at both left and right sides of the platform 20, respectively.

[Fire Fighting Nozzles]

Figure 3:
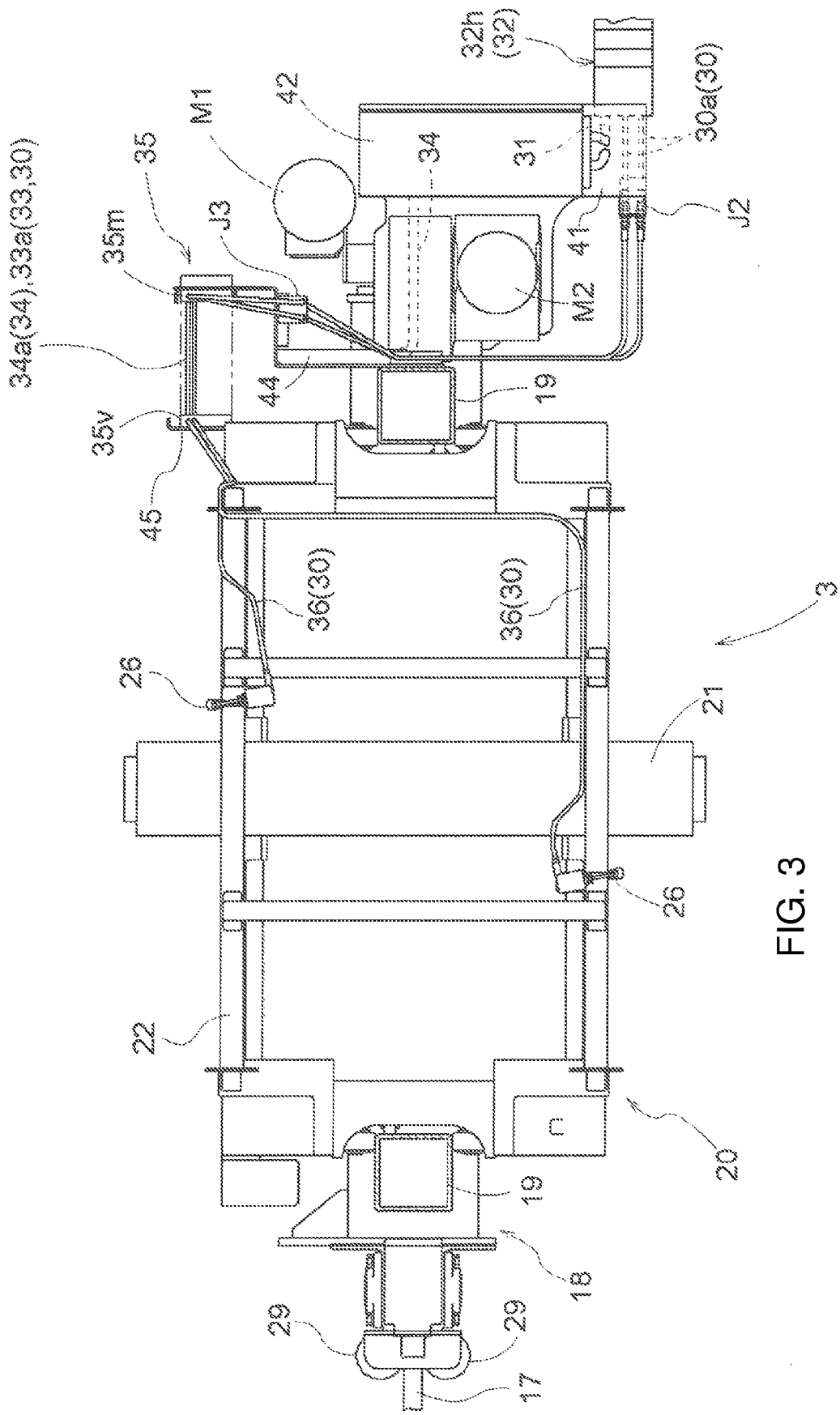
FIG. 3 is a plan view illustrating a stacker crane.
Figure 7:
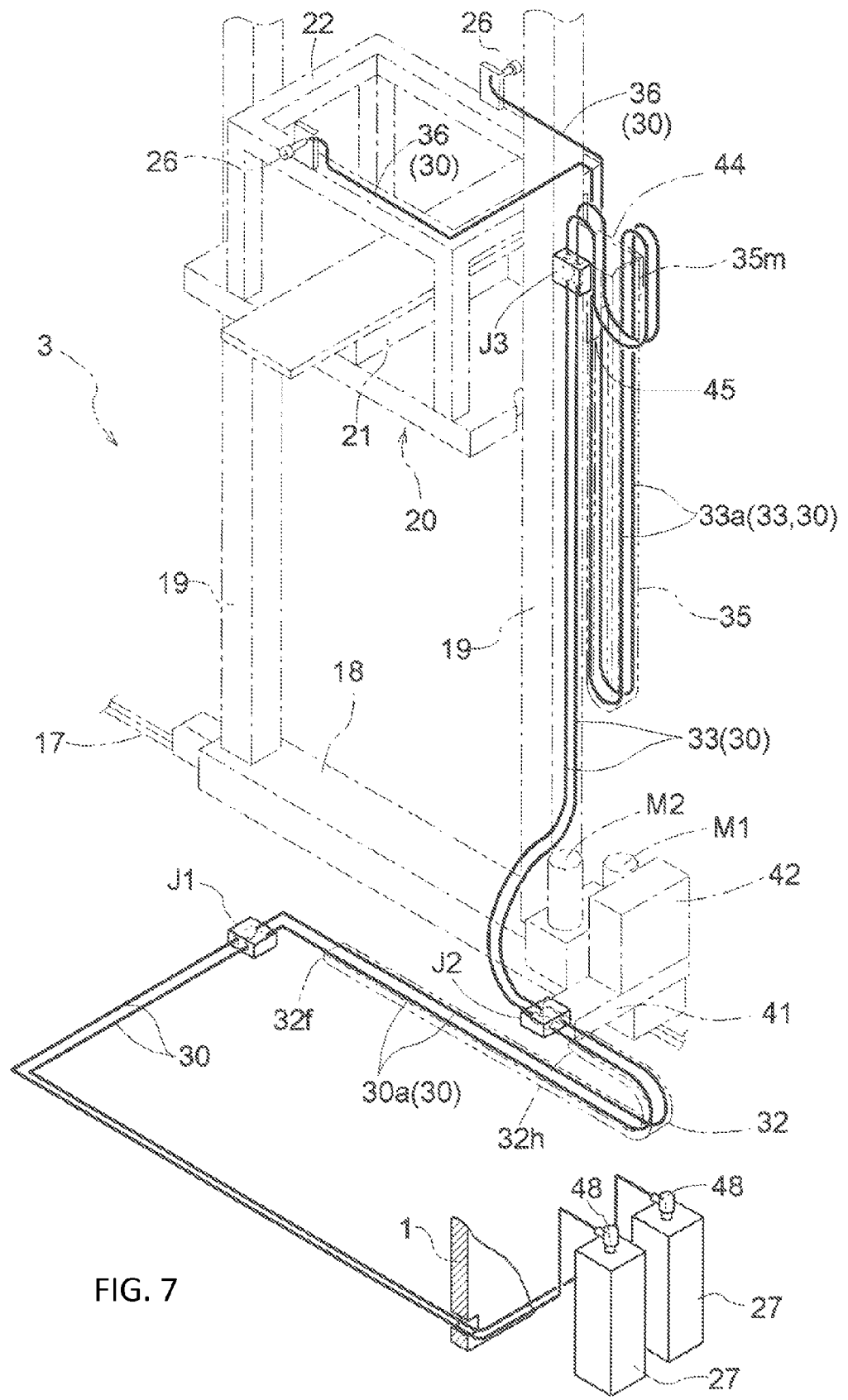
FIG. 7 is a perspective view depicting an arrangement of a pair of fire fighting hoses.

As depicted in FIGS. 2, 3, and 7, a pair of fire fighting nozzles 29 for spreading carbon dioxide gas to the storage spaces 11 is provided on the supporting frame 22 of the platform 20. To the fire fighting nozzles 26, carbon dioxide gas is supplied as an extinguishant through a fire fighting hose 30 from the carbon dioxide cylinder 27, which is provided close to the compartment wall 1 in the normal temperature environment space Z1. As such, a fire fighting nozzle 26 for spreading carbon dioxide gas to the storage space 11 upon receiving carbon dioxide gas as an extinguishant from the carbon dioxide gas cylinder 27 as an extinguishant supply source is provided on the platform 20 of the stacker crane 3. A fire fighting hose 30 is provided to connect the carbon dioxide cylinder 27 and the fire fighting nozzle 26 and to communicate the carbon dioxide gas therethrough.

In the present embodiment, a pair of fire fighting nozzles 26, which is arranged to face the pair of article storing spaces 2, is arranged; and two fire fighting hoses 30 are provided for a pair of fire fighting nozzles 26, respectively. These nozzles are connected to a pair of carbon dioxide cylinder 27, respectively.

[Carbon Dioxide Cylinder]

As shown in FIGS. 6 and 7, on the top of the carbon dioxide cylinders 27, electro-magnetic valves 48 are provided as a regulator and an electro-magnetic type on-off valve. The on-off operation of the electro-magnetic valves 48 is controlled by the controller H to be switched between carbon dioxide supply condition in which carbon dioxide gas is supplied from the cylinder 27 to the air fighting hoses 30 and carbon dioxide supply stop condition. Since the electro-magnetic valves 48 are provided in the normal temperature environment space Z1, which is in a range of operation of the valves temperature guaranteed, the operation is guaranteed.

[Travelling Cable Guide]

As shown in FIGS. 1, 2 and 6, the controller H as a ground side controller for controlling the operation of the stacker crane 3 is located in the normal temperature environment space Z1. The controller H and the stacker crane 3 are connected to each other by a control line 31, which penetrates through the compartment wall 1 for transmitting control signals. The control line 31 is contained in the travelling cable guide 32 in the high temperature environment space Z2 being provided along the travelling path, and comprises a travelling part to be guided 31a, whose path is transformable in accordance with the course of the travelling carriage 18. The control line 31 is composed of a bundle of harnesses in which a plurality of signal lines are bundled and protected by a nylon sleeves, etc. and they are bundled and contained in a travelling cable guide 32.

The fire fighting hose 30 is contained in the travelling cable guide 32 in the high temperature environment space Z2 and comprises a travelling portion to be guided 30a, whose path is deformable in accordance with the course of the travelling carriage 18. That is to say, the control line 31 and the fire fighting hose 30 are contained in the common travelling cable guide 32.

Figure 4:
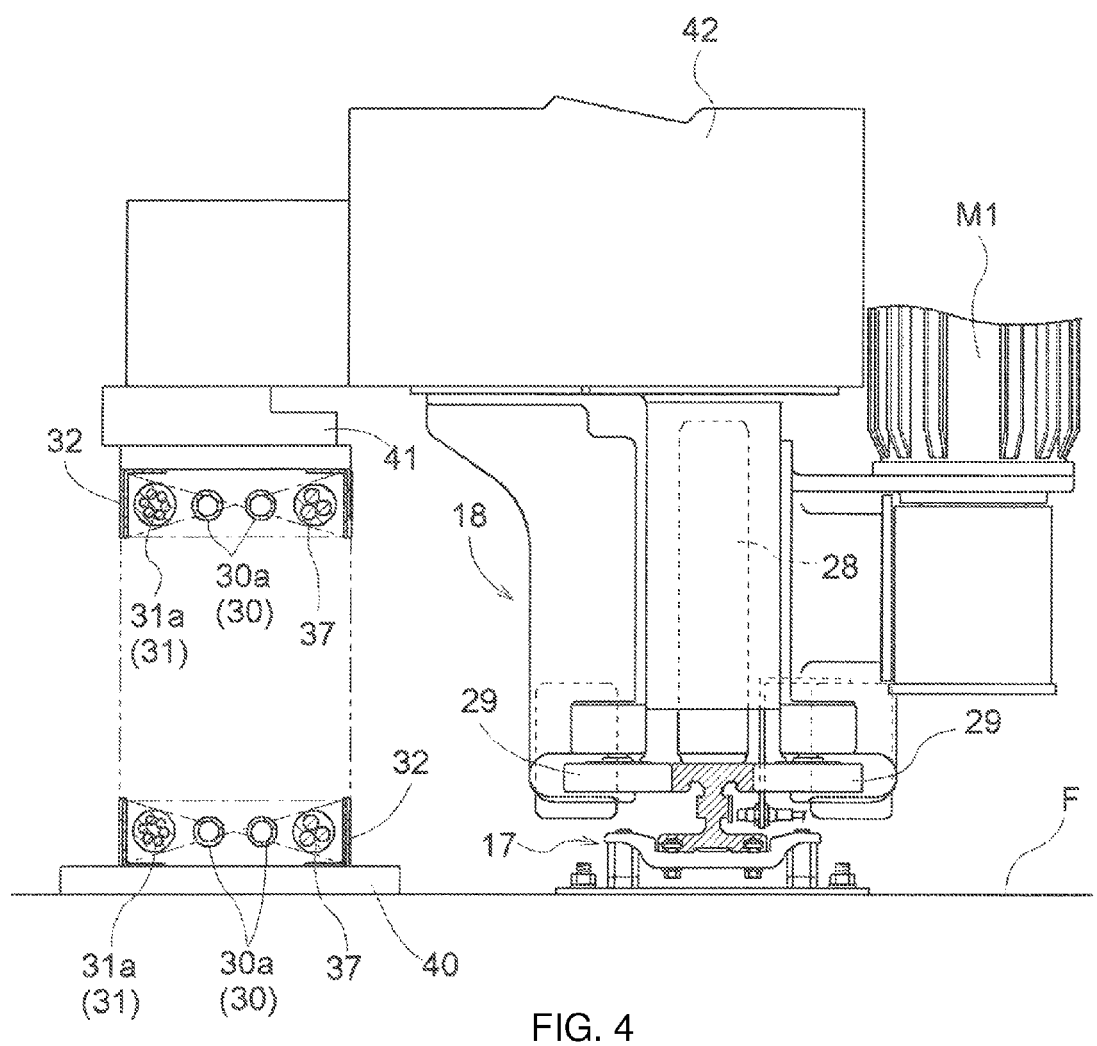
FIG. 4 is an enlarged front view representing a lower part of the stacker crane.

As shown in FIGS. 1 and 4, a plate 40 for installing a guide is provided on the floor surface F along the rail 17; one of the ends 32f of the cable guide 32 at the downstream side of the extinguishant supply source direction (hereinafter, referred to floor side end 320) is connected to the plate 40 for installing the guide at an intermediated point of the travelling path; and the other end 32h (hereinafter, referred to travelling carriage side end 32h) is connected to and supported by a bracket 41 for attaching a cable guide, which is provided at the HP side end portion of the travelling carriage 18.

In the vicinity of the bracket 41 for attaching cable guide, an inverter containing box 42 is provided for containing a travelling inverter INV1, a lifting inverter INV2 and a transferring inverter INV 3. As also illustrated in FIGS. 2 and 3, the control line 31, which is drawn out from the travelling carriage side end 32h of the travelling cable guide 32 in a bundled condition is drawn into the box in a bundled condition; and each signal line constituting the control line 31 is connected to an inverter or a terminal plate 43 in the box 42 (see FIG. 6).

As shown in FIGS. 3 and 4, the travelling carriage 18 has a narrower width than that of the platform 20 in its width direction; and the travelling cable guide 32 is arranged on the floor surface F so as to be superimposed to the platform 20 in the width direction of the carrier 18. Thereby, the travelling cable guide 32 can be arranged effectively, using the space formed at both sides of the travelling carriage 18 when the platform 20 is lifted down to its lower limit position, so that the space efficiency in case of providing the running cable guide 32 is improved.

It should be noted that in FIG. 4 the numerical reference 28 refers to a driving wheel which is rotatably driven by the travelling motor M1 to run on the upper surface of the rail 17, and the numerical reference 29 refers to a pair of left and right guide rollers which run on the left and right side surfaces of the rail 17 to restrict the movement of the travelling carriage 18 in a left and right direction.

[Lifting Cable Guide]

As shown in FIGS. 2, 3 and 7, the part of fire fighting hose 30 positioned in the high temperature environment space Z2 has a portion for setting masts 33, which is provided along the lifting mast 19 at HP side, in a downstream side of the travelling portion to be guided 30a in an extinguishant supply source direction. The portion for standing masts 33 of the fire fighting hose 30 comprises lifting portion to be guided 33a whose path is deformable in accordance with the lifting of the platform 20, contained in the lifting cable guide 35. A pair of fire fighting hoses 30 drawn out from the lifting cable guide 35 is fixed to the supporting frame 22 of the platform 20 at a plurality of points in a longitudinal direction by means of insulation locks to be connected to the pair of fire fighting nozzle 26, respectively.

As represented in FIGS. 2, 3 and 6, the stacker crane 3 comprises a transfer device control line 34, among the control signals sent to the control line 31. The control line 34 is for sending control signal for controlling the fork device 21. The transfer device control line 34 includes a signal line for sending output signal from the transferring rotary encoder RE3 (see FIG. 6) on the platform 20 and a signal line for sending signals detected by the limit switch of the pair of article shape deformation detecting device 25 (not shown). One end of the transfer device control line 34 is connected to the terminal plate 43 contained in the box 42, and taken out from the opening of the box 42, then extended along the lifting mast 19 at the HP side, and the other end thereof is connected to the transferring rotary encoder RE3. The transfer device control line 34 comprises a lifting portion to be guided 34a, which is contained in the lifting cable guide 35, and whose path is deformable along the elevation of the platform 20.

That is to say, the transfer device control line 34 and the mast setting portion 33 of the fire fighting hose 30 are contained in the common lifting cable guide 35 and comprise a lifting portion to be guided 33a, 34a, respectively, whose paths are deformable along the elevation of the platform 20.

As shown in FIGS. 2, 3 and 7, one end of the lifting cable guide 35 at the downstream in the extinguishant supply source direction (hereinafter, referred to mast side end 35m) is connected to and supported by a bracket 44 for attaching the lifting cable guide, which is provided from the HP side lifting mast 19 along one of the sides in the width direction of the travelling carriage 18, while the other end (hereinafter, referred to platform side end 35v) is connected to and supported by a platform side attachment bracket 45, which is provided at the HP side end portion of the platform 20.

It should be noted that in the present embodiment the power for operating the stacker crane 3 is supplied from the power supply 46 via a power supply cable 37 being provided from the normal temperature environment space Z1 through the compartment wall 1 (see FIG. 6). As shown in FIGS. 4 and 6, the power supply cable 37 is contained in the common travelling cable guide 32 as well as the fire fighting hose 30 and the control line 31, and comprises a travelling portion to be guided 37a whose path is deformable along the course of the travelling carriage 18. The power supply cable 37 taken out from the travelling carriage side end 32h of the travelling cable guide 32 is drawn into the box 42 and connected to the travelling inverter INV1, the lifting inverter INV2 and the transferring inverter INV3, respectively, to supply an electric power.

In addition, as shown in FIG. 6, the electric power supplied from the transferring inverter INV3 to the transferring motor M3 is sent from the transferring power supply cable 38. The transferring power supply cable 38 is also contained in the common lifting cable guide 35 as well as the mast setting portion 33 of the fire fighting hose 30 and the control signal line 34 for transfer device, and includes a lifting portion to be guided 38a, whose path is deformable in accordance with the lifting of the platform 20.

[Hose Construction]

Figure 5:
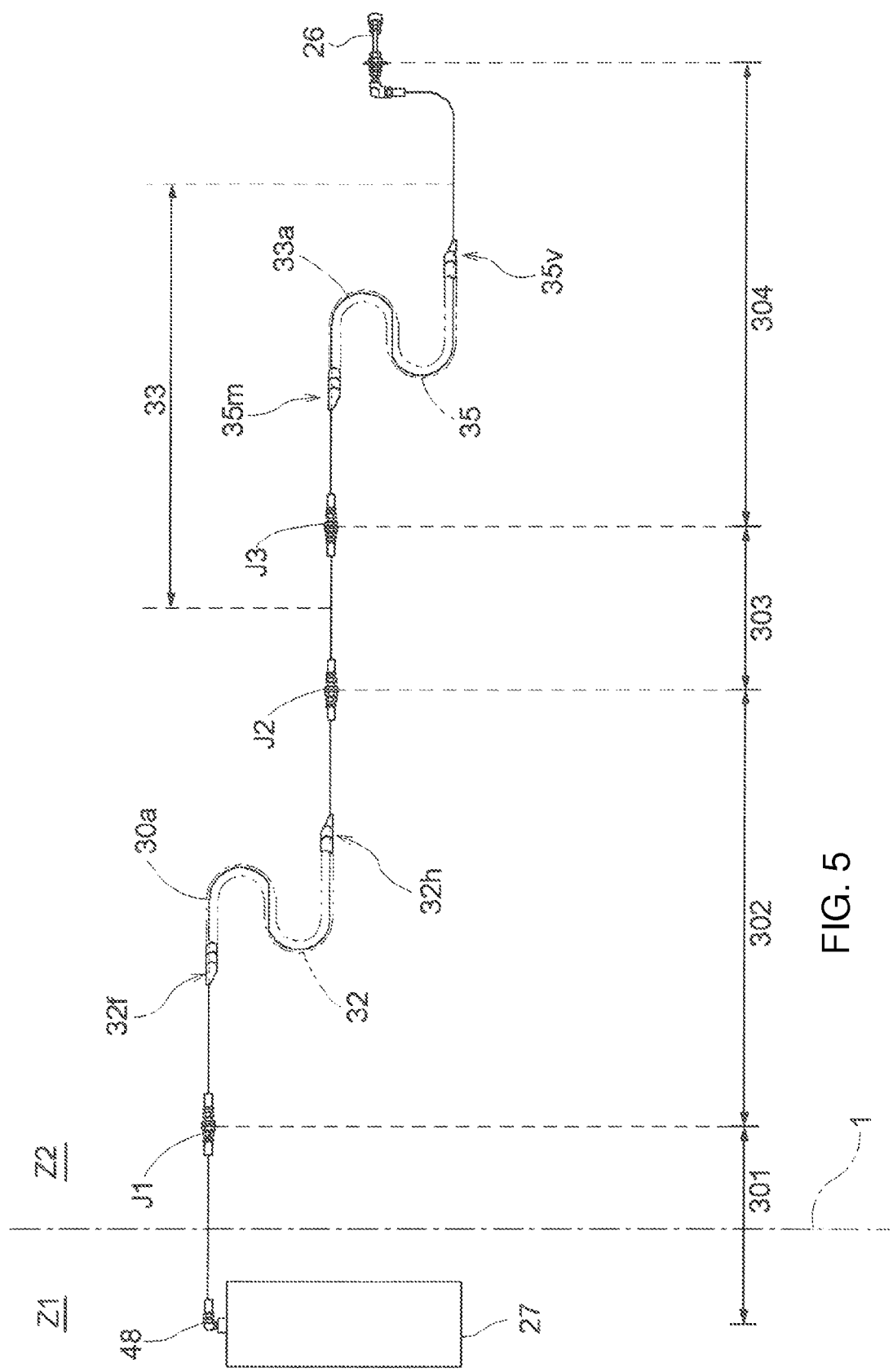
FIG. 5 is a configuration diagram of fire fighting hoses.

As depicted in FIG. 5, each hose of the pair of fire fighting hoses 30 is divided into four parts in a longitudinal direction by three relay connecting parts J1 to J3. That is to say, the fire fighting hose 30 is composed of four hose parts 301 to 304, i.e. a first hose part 301, which is provided between the electromagnetic valve 48 of the carbon dioxide cylinder 27 and a first relay connecting part J1 provided on the floor surface; a second hose part 302 provided between the first relay connecting part J1 and the second relay connecting part J2 at the HP side end portion of the travelling carriage 18, and the intermediate part thereof constitutes the travelling portion to be guided 30a contained in the travelling cable guide 32; a third hose part 303 provided between the second relay connecting part J2 and the third relay connecting part J3 at the intermediate height of the HP side lifting mast 19; and a fourth hose part 304 provided between the third relay connecting part J3 and the fire fighting nozzle 26 and its intermediate part constitutes the lifting portion to be guided 33a contained in the lifting cable guide 35.

To both ends of the hose parts 301 to 304 pipe sleeves are attached to form a communicating path for carbon dioxide gas through the first to third relay connecting parts J1 to J3. The hose parts 301 to 304 are detachably connected to each other; the communicating path for carbon dioxide gas from electromagnetic valve 48 to the fire fighting nozzle 26 is formed by connecting all hose parts 301 to 304 through together.

The travelling part to be guided 30a of the fire fighting hose 30, whose path is deformable in accordance with the run of the travelling carriage 18, contained in the running cable guide 32 is formed at the intermediate portion of the second hose part 302. Therefore, the second hose part 302 contains the travelling part to be guided 30a of the fire fighting hose 30. The both ends of the second hose part 302 are detachably connected to the first hose part 301 as a ground side hose part fixed on the ground side, i.e. floor surface F, and to the upper stream portion in the extinguishant supply source direction of the third hose part 303, which is as a crane side hose part fixed to the travelling carriage 18 and the HP side lifting mast 19, respectively. Further, the mast setting portion 33 along the HP side lifting mast 19 of the fire fighting hose 30 is constituted of the downstream side portion in extinguishant supply source direction of the third hose part 303 and the upper stream side portion in extinguishant supply source direction of the fourth hose part 304.

[Structure of Control System]

As in the block diagram in FIG. 6 showing the control system, the travelling motor M1 and the travelling inverter INV1 for driving the travelling motor M1, the lifting motor M2 and the lifting inverter INV2 for driving the lifting motor M2, and the transferring motor M3 and the transferring inverter INV3 for driving the transferring motor M3 are provided on the stacker crane 3, which is in the high temperature environment space Z2. The controller H in the normal temperature environment space Z1 is constituted to independently send control signals for the motors to each inverter provided on the stacker crane 3 in the high temperature environment space Z2.

As such control signals to be sent to the inverters, for example, pulse signals for controlling voltage, frequency in a PWM controlling manner are provided. That is to say, high level calculation for controlling the travelling operation, lifting operation, and transferring operation of the stacker crane 3 is performed in the controller H, whilst the motors are driven by the inverters operated based on signals which does not require calculation to operate the stacker crane 3. Thereby, it is not necessary to provide highly integrated semiconductor parts, such as high performance microcomputer by which a high speed calculation is possible, in which the upper limit of the proper operational temperature is comparatively low, at the stacker crane 3 side in the high temperature environmental space Z2. Therefore, any system failure due to the thermal runaway of the semiconductor device for performing calculation procedure for controlling the stacker crane 3 can be prevented and properly performance of the operation of the stacker crane 3 can be achieved.

It should be noted that in the present embodiment, as shown in FIG. 6 the controller H has an emergency stop means, which works in a manner in which once ON signal of the door switch 10 is interrupted during the stacker crane 3 is being driven, the power supply from the power supply cable 37 to the power supply device 47 is stopped. Thereby, if an operator enters into the high temperature environmental space Z2 from the entrance 5 during the time when the stacker crane 3 is being operated, any contact accident with the stacker crane 3 can be prevented.

[Extinguishing Process]

Next, the control operation of fire extinction by the controller H in the event of fire on articles W contained in the storage spaces 11 will be briefly explained below.

When a fire breaks out on articles W contained in the storage spaces 11, a fire sensor 12 detects the fire and sends a fire detection signal to the controller H. The controller H receives the fire detection signal under a condition in which it can identify which fire sensor 12 has sent the signal; then detects the storage space 11 on fire and positions the fork device 21 of the stacker crane 3 to a loading position in the storage space 11. When a fire breaks out, if the stacker crane 3 is transferring another article W, it may move the stacker crane to the storage space 11 after the transferring has been finished or after interrupting the transfer.

After the movement of the fork device to the fired storage space 11 has been finished, the controller H controls the electromagnetic valve 48 of the carbon dioxide cylinder 27, which is connected to the fire fighting nozzle 26 on the side corresponding to the storage rack 2 of the fired space 11, open in order to put it in a carbon dioxide gas supply condition. Thereby, carbon dioxide gas is injected from the fire fighting nozzle 26 to the fired article W in the storage space 11 to perform an initial extinction on the article W.

Once the initial extinction is completed during a given time period, the controller H operates to close the electro-magnetic valve 48 to change it to the stop condition and controls the operation of the stacker crane 3 to take the article W from the storage space 11 and transfer it to the water tank 13, where the stacker crane transfers the article W to the frame 14. When the article W is mounted on the frame 14, the frame 14 is lifted down to immerse it into the water tank 13 to extinct the fire on the article W.

[Other Embodiments]

The present invention is not limited to the above explained embodiment, but may be modified within the scope of the invention. The other embodiments will be explained below.

(1) In the above-mentioned embodiment, the power for operating the stacker crane 3 is supplied by electric power supply cable 37 connected to the stacker crane 3. Instead, an electric power supply rail may be provided on the ground along the travelling rail 17 and power collector which can receive the power from the rail 17 in a contacted or non-contacted manner is provided on the stacker crane 3, so that the electric power for operating the stacker crane 3 is supplied from the power collector and the power supply rail.

(2) In the above-mentioned embodiment, the article to be stored is collected packages of a plurality of Lithium ion batteries, however, the present invention may be applied to other ignitable articles.

(3) In the above-mentioned embodiment, each storage space 11 has a fire sensor 12 to detect the fired space. However, other structure for detecting the fired rack can be applied. For instance, such an example can be considered that an image pick-up device, such as an infrared camera for a high temperature environment can be provided in the storage space or the stacker crane to detect a fire from the picked-up image thereof.

(4) In the above-mentioned embodiment, carbon dioxide gas is exemplified as an extinguishant, but water or foamed liquid can be used therefor.

(5) In the above-mentioned embodiment, the transfer device control line is contained in the lifting cable guide, which is commonly used as the lifting portion to be guided for firefighting hose, is exemplified. However, it may be possible to provide another cable guide only for the transfer device control line. Further, the control signal for the transfer device can be transmitted in a wireless manner.

LIST OF NUMERICAL REFERENCES

2 storage rack
3 stacker crane
11 storage space
18 travelling carriage
19 lifting mast
20 platform
21 transfer device
26 fire fighting nozzle
27 extinguishant supply source
30 fire fighting hose
30*a* running portion to be guided
301 ground side hose part
302 part of the fire fighting hose including travelling portion to be guided
303 crane side hose part
31 control line
31*a* travelling portion to be guided
32 travelling cable guide
33 portion for establishing mast
33*a* lifting portion to be guided
34 transfer device control line
34*a* lifting portion to be guided
35 lifting cable guide
48 electro-magnet valve
F floor surface
H ground side controller
INV1 travelling inverter
INV2 lifting inverter INV3 transferring inverter
M1 travelling motor
M2 lifting motor
M3 transferring motor
RE1 travelling rotary encoder
RE2 lifting rotary encoder
RE3 transferring rotary encoder
W articles
Z1 normal temperature environment space
Z2 high temperature environment space

What is claimed is:

1. An automated storage system, comprising:
    article storage racks having a plurality of storage spaces for storing articles;
    a stacker crane having a travelling carriage which can freely travel along a travelling path established on the front side of the articles storage racks, a platform which can freely move up and down along lifting masts stood on the travelling carriage, and a transfer device equipped on the platform to freely transfer the articles between the platform and the storage spaces;
    a ground controller provided on a ground side for controlling an operation of the stacker crane;
    wherein fire fighting nozzles for spreading fire extinguishant to the storage spaces are provided on the platform of the stacker crane, being supplied with fire extinguishant from a fire extinguishant supply source which freely supplies fire extinguishant;
    wherein said article storage racks and said stacker crane are provided in a high temperature environmental space where the temperature is kept higher than that in a normal temperature environmental space;
    wherein said fire extinguishant supply source and said ground side controller are provided in the normal temperature environment space;
    wherein a control line connected from the ground side controller to the stacker crane is provided to transmit control signals;
    wherein a fire fighting hose connected from the fire extinguishant supply source to the fire fighting nozzle is provided to communicate the extinguishant from the fire extinguishant supply source to the fire fighting nozzle; and
    wherein said control line and said fire fighting hose are contained in a common travelling cable guide provided along the travelling path and comprise a travelling portion to be guided whose path is deformable along the course of the travelling carriage.

2. The automated storage system according to claim 1, wherein:
    said travelling carriage has a width narrower than that of the platform in the width direction of the travelling carriage; and
    said travelling cable guide is positioned so as to be superimposed over the platform on the floor surface in a width direction of the travelling carriage.

3. The automated storage system according to claims 1 or 2, wherein:
    the part of the fire fighting hose positioned in the high temperature environment space has a mast setting portion provided along the lifting masts in a downstream side of the travelling portion to be guided in an extinguishant supply source direction;
    said stacker crane has a transfer device control line for transmitting a control signal to the transfer device from amongst the control signals transferred to the control line;
    the transfer device control line is provided along the lifting masts; and
    the transfer device control line and the mast setting portion of the fire fighting hose are contained in a common lifting cable guide and comprise a lifting portion to be guided whose path is deformable in accordance with the lifting of the platform.

4. The automated storage system according to claim 3, wherein both end portions of the travelling portion to be guided of the fire fighting hose are detachably connected to a ground side hose part arranged in a fixed condition with the ground side and a crane side hose part arranged in a fixed condition with the travelling carriage and the lifting mast.

5. The automated storage system according to claims 1 or 2, wherein;
    said extinguishant is carbon dioxide gas;
    the extinguishant supply source comprises a carbon dioxide cylinder; and
    an electro-magnetic on/off valve for switching the condition between a gas supplying condition where carbon dioxide gas is being supplied from the carbon dioxide cylinder to the fire fighting hose and a gas supply stop condition is provided in the normal temperature environmental space.

6. The automated storage system according to claims 1 to 2, wherein:
    said stacker crane comprises a travelling motor and a running inverter for driving the travelling motor, a lifting motor and a lifting inverter for driving the lifting motor, and a transferring motor and a transferring inverter for driving the transferring motor; and
    the ground side controller can freely send the control signals for corresponding motors independently to the travelling inverter, the lifting inverter and the transferring inverter.

* * * * *